United States Patent
Funakawa

(10) Patent No.: US 10,146,221 B2
(45) Date of Patent: Dec. 4, 2018

(54) INFORMATION PRESENTING APPARATUS AND INFORMATION PRESENTING METHOD

(71) Applicant: Nissan Motor Co., Ltd., Yokohama-Shi, Kanagawa (JP)

(72) Inventor: Masami Funakawa, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 94 days.

(21) Appl. No.: 15/128,036

(22) PCT Filed: Mar. 26, 2014

(86) PCT No.: PCT/JP2014/058483
§ 371 (c)(1),
(2) Date: Sep. 21, 2016

(87) PCT Pub. No.: WO2015/145606
PCT Pub. Date: Oct. 1, 2015

(65) Prior Publication Data
US 2017/0220039 A1    Aug. 3, 2017

(51) Int. Cl.
*G05D 1/00* (2006.01)
*B60W 30/16* (2012.01)
(Continued)

(52) U.S. Cl.
CPC ......... *G05D 1/0061* (2013.01); *B60K 28/066* (2013.01); *B60W 30/14* (2013.01);
(Continued)

(58) Field of Classification Search
CPC .. G05D 1/0061; B60W 30/182; B60W 30/14; B60W 50/082; B60W 40/08; B60W 2900/00; B60W 2040/089; B60W 2540/04
See application file for complete search history.

(56) References Cited

U.S. PATENT DOCUMENTS 5,469,356 A * 11/1995 Hawkins ................ G01C 21/26
                                                                    318/591
5,774,069 A *  6/1998 Tanaka ....................... B60T 7/12
                                                                    180/167
(Continued)

FOREIGN PATENT DOCUMENTS

JP    09-161196 A    6/1997
JP    11-185200 A    7/1999
(Continued)

OTHER PUBLICATIONS

Masami Funakawa, Ambient Information Display Method Based upon Spatio-temporal Properties of Driver's Field of View, Automotive Engineering and Technologies, vol. 40, No. 5, pp. 1191-1196, Sep. 2009.

(Continued)

*Primary Examiner* — Frederick M Brushaber
(74) *Attorney, Agent, or Firm* — Young Basile Hanlon & MacFarlane, P.C.

(57) ABSTRACT

An information presenting apparatus is used in an autonomous vehicle capable of switching between autonomous driving control and manual driving control. The information presenting apparatus determines a response action for checking that the driver is ready to take over when the autonomous driving control is switched to the manual driving control, performs control for requesting the driver to perform the response action determined, and detects the response action performed by the driver.

21 Claims, 10 Drawing Sheets

(51) Int. Cl.
*B60W 50/14* (2012.01)
*B60W 40/08* (2012.01)
*B60K 28/06* (2006.01)
*B60W 30/182* (2012.01)
*B60W 50/08* (2012.01)
*B60W 30/14* (2006.01)

(52) U.S. Cl.
CPC .......... *B60W 30/16* (2013.01); *B60W 30/182* (2013.01); *B60W 40/08* (2013.01); *B60W 50/082* (2013.01); *B60W 50/14* (2013.01); *B60W 2040/089* (2013.01); *B60W 2040/0827* (2013.01); *B60W 2040/0863* (2013.01); *B60W 2050/146* (2013.01); *B60W 2540/02* (2013.01); *B60W 2540/04* (2013.01); *B60W 2540/26* (2013.01); *B60W 2900/00* (2013.01); *G05D 2201/0213* (2013.01)

(56) References Cited

U.S. PATENT DOCUMENTS

| | | | |
|---|---|---|---|
| 8,041,484 | B2 | 10/2011 | Imai et al. |
| 9,513,632 | B1* | 12/2016 | Gordon ............ G05D 1/0061 |
| 9,688,288 | B1* | 6/2017 | Lathrop ............ B60W 50/14 |
| 9,785,145 | B2* | 10/2017 | Gordon ............ G05D 1/0061 |
| 9,834,224 | B2* | 12/2017 | Gordon ............ B60W 50/082 |
| 9,869,560 | B2* | 1/2018 | Gordon ............ B60W 30/00 |
| 2008/0231461 | A1 | 9/2008 | Sanchez et al. |
| 2013/0211656 | A1* | 8/2013 | An ............ G05D 1/0221 701/25 |
| 2014/0088814 | A1* | 3/2014 | You ............ G05D 1/0061 701/23 |
| 2014/0156133 | A1* | 6/2014 | Cullinane ............ B60W 30/00 701/23 |
| 2015/0210272 | A1* | 7/2015 | Edgren ............ G08B 6/00 701/23 |
| 2017/0235305 | A1* | 8/2017 | Jung ............ B60W 40/072 701/23 |
| 2017/0259832 | A1* | 9/2017 | Lathrop ............ B60W 50/14 |
| 2018/0032086 | A1* | 2/2018 | Punithan ............ G05D 1/0016 |
| 2018/0043819 | A1* | 2/2018 | Kim ............ B60Q 1/085 |
| 2018/0043904 | A1* | 2/2018 | Cullinane ............ B60W 30/00 |

FOREIGN PATENT DOCUMENTS

| | | |
|---|---|---|
| JP | 2002-183900 A | 6/2002 |
| JP | 2006-184854 A | 7/2006 |
| JP | 2007-055321 A | 3/2007 |
| JP | 2008-290680 A | 12/2008 |
| JP | 2009-098061 A | 5/2009 |
| JP | 2013-041524 A | 2/2013 |

OTHER PUBLICATIONS

Griffiths, P., et al., Shared control between human and machine: Haptic display of automation during manual control of vehicle heading, Mar. 27, 2004, pp. 358-366.

* cited by examiner

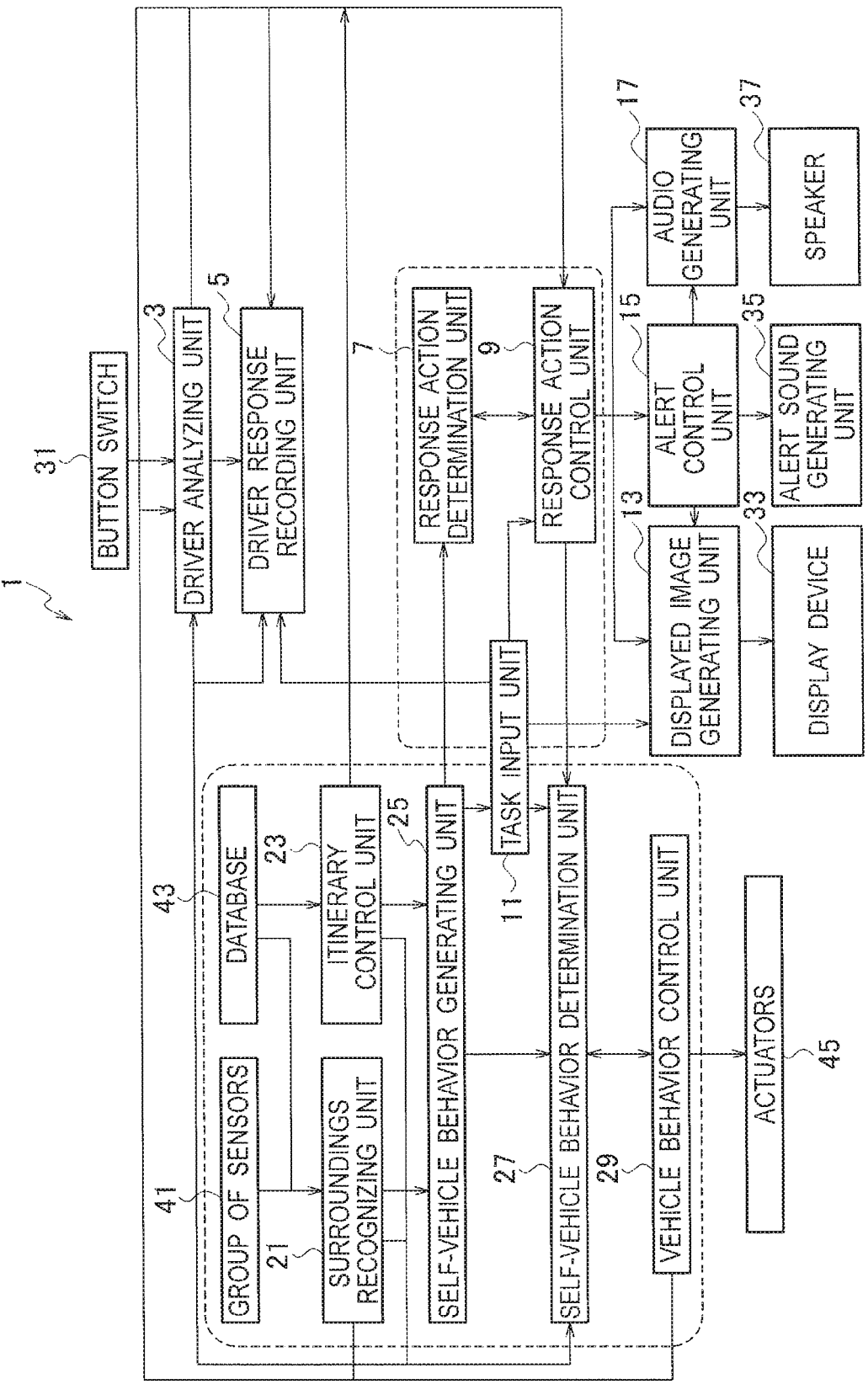

INFORMATION PRESENTING APPARATUS AND INFORMATION PRESENTING METHOD

TECHNICAL FIELD

The present invention relates to an information presenting apparatus for use in an autonomous vehicle capable of switching between autonomous driving control, in which the vehicle is driven under autonomous cruise control, and manual driving control, in which the vehicle is driven by a driver. The present invention also relates to an information presenting method.

BACKGROUND

Autonomous vehicles, the cruise control of which is autonomously performed by an autonomous driving system, have been developed recently. Such an autonomous vehicle determines the conscious level of the driver by testing the consciousness of the driver during the autonomous driving control. Japanese Patent Application Publication No. Hei 11-185200 discloses a conventional method for determining the conscious level of a driver in a vehicle capable of autonomous cruise control.

The driver conscious level determination method disclosed in Japanese Patent Application Publication No. Hei 11-185200 gives a test item to the driver after a lapse of a predetermined driving time and determines the conscious level of the driver by evaluating a response to the test item.

In this regard, during the autonomous driving control, the driver of the autonomous vehicle entrusts the driving to the autonomous driving system, and is highly likely not to recognize the surroundings or know the state of the vehicle, which the driver always does when manually driving the vehicle. However, an autonomous vehicle may switch from the autonomous driving control to the manual driving control when the driver is in such a state. The driver is therefore required to be always ready to take over the driving from the autonomous driving system.

The conventional driver conscious level determination method described above merely determines whether the driver is conscious, and therefore cannot determine whether or not the driver can actually take over when the autonomous driving control is switched to the manual driving control.

SUMMARY

The present invention has been made in view of such circumstances, and has an objective to provide an information presenting apparatus and an information presenting method which can check whether a driver is ready to take over when the autonomous driving control is switched to the manual driving control.

To solve the above problem, an information presenting apparatus according to one aspect of the present invention is used in an autonomous vehicle capable of switching between autonomous driving control and manual driving control. This information presenting apparatus determines a response action to be performed by a driver to check that the driver is ready to take over when the autonomous driving control is switched to the manual driving control, performs control for requesting the driver to perform the response action determined, and detects the response action performed by the driver.

BRIEF DESCRIPTION OF THE DRAWINGS

FIG. 1 is a block diagram showing the configuration of an information presenting apparatus according to a first embodiment of the present invention;

DETAILED DESCRIPTION OF THE EMBODIMENTS

Figure 2A:
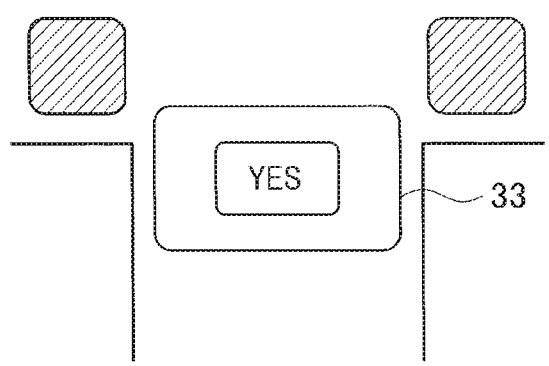
FIG. 2 is a diagram illustrating examples of buttons, operated by a driver, of the information presenting apparatus according to the first embodiment of the present invention.

First to third embodiments of the present invention are described below with reference to the drawings.

[First Embodiment]

[Configuration of the Information Presenting Apparatus]

FIG. 1 is a block diagram showing the configuration of an information presenting apparatus according to the present embodiment. As shown in FIG. 1, an information presenting apparatus 1 according to the present embodiment includes a driver analyzing unit 3, a driver response recording unit 5, a response action determination unit 7, a response action control unit 9, a task input unit 11, a displayed image generating unit 13, an alert control unit 15, and an audio generating unit 17. The information presenting apparatus 1 further includes a surroundings recognizing unit 21, an itinerary control unit 23, a self-vehicle behavior generating unit 25, a self-vehicle behavior determination unit 27, a vehicle behavior control unit 29, and a button switch 31.

The information presenting apparatus 1 according to the present embodiment is mounted on an autonomous vehicle capable of switching between autonomous driving control, in which the vehicle is driven under autonomous cruise control, and manual driving control, in which the vehicle is driven by a driver (an autonomous vehicle will be referred to simply as a vehicle below). The vehicle is equipped with an autonomous driving system, which performs autonomous cruise control of the vehicle based on the traveling conditions and outside environments of the vehicle. The autonomous driving system switches from the autonomous driving control to the manual driving control at predetermined timing or as needed. For example, the autonomous driving system transfers operational authority to the driver as soon as a sensor installed at the steering wheel or the pedal detects that the driver has placed his or her hand on the steering wheel or has placed his or her foot on the pedal. Specifically, the autonomous driving system transfers operational authority of the steering wheel and operational authority of the pedal separately according to the driver's operation.

The driver analyzing unit 3 detects the state and actions of the driver from devices mounted on the vehicle, as well as acquires information on an operational state of the vehicle and the like, and analyzes what kind of movements and driving operations the driver has performed in what kind of state. Specifically, the driver analyzing unit 3 of the present embodiment is connected to the button switch 31. The driver analyzing unit 3 detects operations performed on the button switch 31 by the driver, and thereby detects a response action performed by the driver.

In addition, the driver analyzing unit 3 can estimate the level of arousal, the level of fatigue, driving accuracy, and driving stability of the driver and the like by analyzing biological signals from the driver. The driver analyzing unit 3 acquires, as physiological information, alpha and theta brainwaves, a heart rate, frequency analysis on heartbeat waveforms, a respiration rate, the frequency of eye movements, a time period of eye closure, a head posture, levels of cortisol and amylase in saliva. Moreover, the driver analyzing unit 3 acquires, as vehicle information, the amount of change in the lateral position of the vehicle, and as behavior information, steering patterns, frequency analysis on steering waveforms, and the like. Based on these pieces of information, the driver analyzing unit 3 estimates the level of arousal, the level of fatigue, driving accuracy, and driving stability.

The driver response recording unit 5 records the state of the driver and responses by the driver such as movements and driving operations performed by the driver. Specifically, the driver response recording unit 5 records, for example, results analyzed by the driver analyzing unit 3, a manual driving operation by the driver, a task inputted from the task input unit 11, and whether a response action has been performed or not. The driver response recording unit 5 records, in particular, information on whether and when the button switch 31 has been operated as the response action.

The response action determination unit 7 determines the response action for checking whether the driver of the vehicle is ready to take over when the autonomous driving control is switched to the manual driving control. In the present embodiment, the response action is an action for checking whether the driver can perform a process of making a decision at the manual driving. The response action is an action in which the driver responds to a request for making a decision about a driving operation of the autonomous vehicle. When manually driving, the driver usually conducts the following steps: "recognizing" the environment surrounding the vehicle, "deciding" an operation to perform, and "operating" the vehicle based on the decision. In the present embodiment, the response action determination unit 7 sets a response action for checking whether the driver can perform the "decision" process of the above three processes, and requests the driver to perform this response action to check whether the driver is ready to take over when the autonomous driving control is switched to the manual driving control. In the present embodiment, the response action determination unit 7 requests the driver to, as a response action, decide on a driving operation of the vehicle and respond by operating a button. Satisfactorily performing the decision process means that the driver is also capable of the recognition process. Thus, the information presenting apparatus 1 of the present embodiment can check whether the driver is capable of the recognition process as well as the decision process.

Specifically, the response action determination unit 7 acquires multiple candidates for self-vehicle behaviors generated by the self-vehicle behavior generating unit 25, and also acquires, from the self-vehicle behavior generating unit 25, information on an area where the vehicle can travel safely (safe travel area information) and information on the position of an obstacle in the surroundings (obstacle position information). The response action determination unit 7 then determines a response action to request from the driver, among the self-vehicle behavior candidates acquired.

The response action control unit 9 performs control for requesting the driver to perform the response action determined by the response action determination unit 7. Specifically, the response action control unit 9 determines timing to request the driver to perform the response action, determines whether the driver has successfully performed the response action or not, and sets an approval flag according to the determination.

The task input unit 11 acquires the self-vehicle behavior candidates generated by the self-vehicle behavior generating unit 25 and displays those candidates on a display device 33 as tasks. The driver operates the vehicle by touching the display device 33 having a touch panel and selecting one of the displayed tasks to be performed immediately afterward. The tasks herein are minimum units of driving operation such as going straight, turning right or left, changing to the left or right lane, stopping, starting, speeding up, or speeding down. The tasks such as going straight and turning right or left are represented by pictograms and displayed on a screen presented to the driver. The task input unit 11 displays the tasks such that the driver can identify which is a task selected by the autonomous driving system, a task selectable by the driver, and a task not selectable by the driver. Thus, the driver can change the task selected by the autonomous driving system by selecting a task which is one of the selectable tasks but not selected by the autonomous driving system. Although the final vehicle behavior is determined by the self-vehicle behavior determination unit 27, the task inputted from the task input unit 11 is preferentially determined as a self-vehicle behavior.

The displayed image generating unit 13, which is connected to the display device 33, generates an image to be presented to the driver and outputs the image to the display device 33 when, for example, requesting the driver to perform a response action or displaying tasks. The display device 33 may be a liquid crystal display, and is placed, for example, at a lower position in front of the driver at an angle of 10 degrees and at a viewing distance of 90 cm. The display device 33 has a touch panel and receives input from the driver.

The alert control unit 15, which is connected to an alert sound generating unit 35, acquires information from the response action control unit 9, and when determining that alert needs to be turned on, sets an appropriate alert sound and outputs a signal to the alert sound generating unit 35. When alert needs to be turned on, the alert control unit 15 also outputs a signal to the displayed image generating unit 13 so that the display device 33 displays an alert image. Similarly, the alert control unit 15 outputs a signal to the audio generating unit 17 so that a speaker 37 outputs an alert message.

The audio generating unit 17, which is connected to the speaker 37, generates an appropriate message and outputs the message to the speaker 37 when, for example, requesting the driver to perform a response action.

The surroundings recognizing unit 21 acquires information on the surroundings of the own vehicle from a group of sensors 41, such as a camera, a radar, and a GPS, incorporated in the own vehicle, and also acquires map data and information on the current location of the own vehicle from a database 43. Based on these pieces of information, the surroundings recognizing unit 21 recognizes the surroundings of the own vehicle and generates surroundings information.

The itinerary control unit 23 acquires the map data and the information on the current location of the own vehicle stored in the database 43, and manages the entire travel route from the current location of the own vehicle to the destination. The itinerary control unit 23 also generates itinerary information containing plans for the entire travel route for the own vehicle.

The self-vehicle behavior generating unit 25 acquires the surroundings information from the surroundings recognizing unit 21 to recognize the surroundings of the own vehicle, and acquires the itinerary information from the itinerary control unit 23 to grasp the travel route of the own vehicle. Based on these pieces of information, the self-vehicle behavior generating unit 25 obtains safe travelable area information and obstacle location information of the own vehicle at the present moment, and calculates multiple candidates for self-vehicle behaviors (travelling paths and speed profiles) by which the own vehicle is capable of traveling within the safe travelable area.

The self-vehicle behavior determination unit 27 acquires the surroundings information from the surroundings recognizing unit 21 to recognize the surroundings of the own vehicle, and acquires the itinerary information from the itinerary control unit 23 to grasp the travel route of the own vehicle. Based on these pieces of information, the self-vehicle behavior determination unit 27 determines a self-vehicle behavior from the self-vehicle behavior candidates generated by the self-vehicle behavior generating unit 25, and outputs the self-vehicle behavior to the vehicle behavior control unit 29. When the driver is to perform the response action, the self-vehicle behavior determination unit 27 always evaluates whether or not the response action is effective, in light of the current surroundings. When a task selected by the driver is inputted by the task input unit 11, the self-vehicle behavior determination unit 27 preferentially determines the input task as the self-vehicle behavior.

The vehicle behavior control unit 29 outputs control signals to each actuator 45 mounted on the own vehicle to execute the self-vehicle behavior determined by the self-vehicle behavior determination unit 27. The vehicle behavior control unit 29 outputs the self-vehicle behavior to the driver analyzing unit 3 as a control result.

Figure 2B:
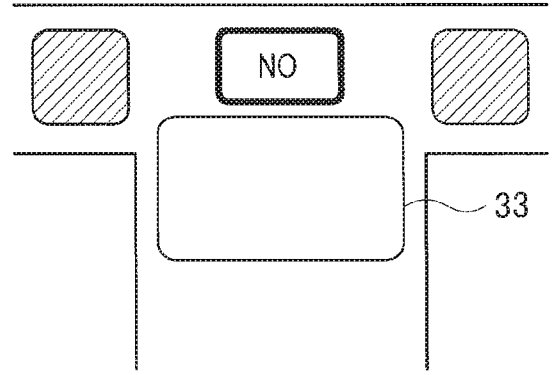
Figure 2C:
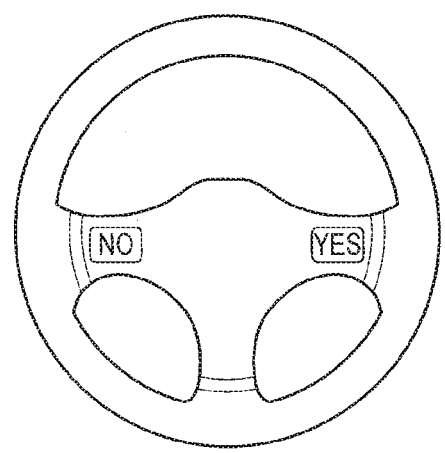

The button switch 31 is a device for receiving input of YES or NO from the driver who has been requested to perform the response action. Specifically, the button switch 31 may have only a YES button, as shown in FIG. 2(a), so that the driver operates the button only when inputting an affirmative decision. In such a case, the response action control unit 9 receives only an affirmative response from the driver. Alternatively, the button switch 31 may have only a NO button, as shown in FIG. 2(b), so that the driver operates the button only when inputting a negative decision. In such a case, the response action control unit 9 receives only a negative response from the driver. Alternatively, the button switch 31 may have both a YES button and a NO button, as shown in FIG. 2(c), so that the driver operates the YES button when inputting an affirmative decision and operates the NO button when inputting a negative decision. In such a case, the response action control unit 9 receives both of an affirmative response and a negative response from the driver. When the driver operates any of such buttons, the button blinks or vibrates, or a sound effect, audio, or the like is outputted so that the driver can be sure that the button has been operated.

As shown in FIG. 2(a), an image of a button may be displayed on the display device 33 so that the driver can input his or her selection by touching the image on the display device 33. This way, a dedicated switch does not need to be installed as the button switch 31. Alternatively, a dedicated button may be installed in the instrument panel of the vehicle, as shown in FIG. 2(b). A switch may be installed in the steering wheel as shown in FIG. 2(c) to achieve operability. However, FIG. 2 merely gives examples. The YES button may be installed in the instrumental panel or the steering wheel, or the NO button may be displayed on the display device 33.

The information presenting apparatus 1 is configured by a general-purpose electronic circuit including a microcomputer, a microprocessor, and a CPU, as well as peripherals, and operates as the above-described units by executing particular programs.

[Procedure of the Response Action Control Loop]

Next, a procedure of a response action control loop by the information presenting apparatus 1 according to the present embodiment is described with reference to the flowchart in FIG. 3.

Figure 3:
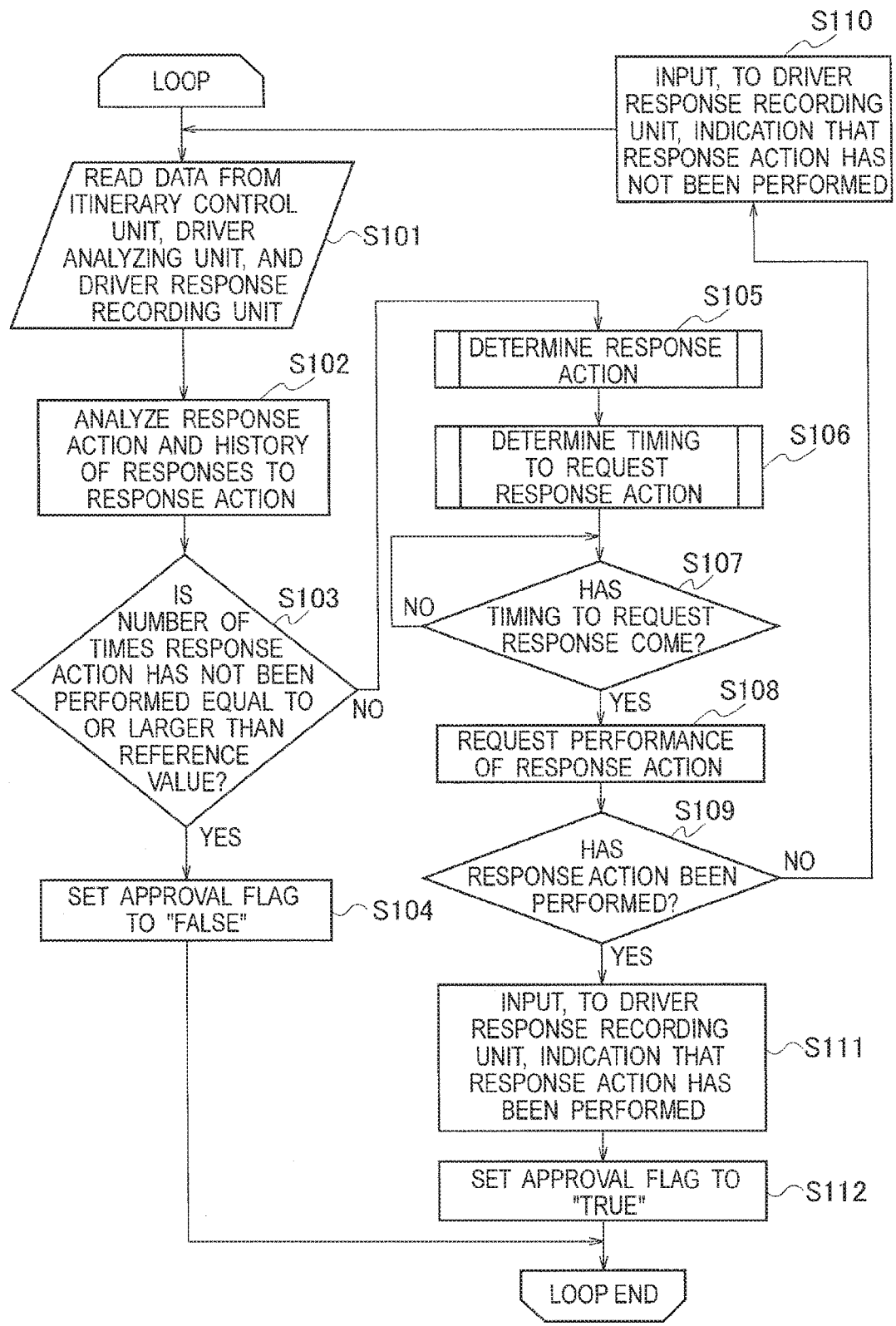
FIG. 3 is a flowchart showing a procedure of a response action control loop performed by the information presenting apparatus according to the first embodiment of the present invention.

As shown in FIG. 3, in Step 101, the response action control unit 9 reads data necessary for executing the response action control loop. Specifically, the response action control unit 9 reads analysis results on driver's movements, driving operations and the like from the driver analyzing unit 3, reads the surroundings information from the surroundings recognizing unit 21, and reads the itinerary information from the itinerary control unit 23. The response action control unit 9 also reads a history of operations on the button switch 31 and a history of responses from the driver, which are recorded in the driver response recording unit 5.

In Step S102, the response action control unit 9 analyzes, based on the data thus read, a response action requested from the driver and the history of driver's responses to the response action.

In Step S103, the response action control unit 9 determines whether or not the number of times the response action has not been performed is equal to or larger than a reference value. The number of times the response action has not been performed includes the driver's not responding to the request for the response action and the driver's responding inappropriately. The response action control unit 9 proceeds to Step S104 when the number of times the response action has not been performed is equal to or larger than the reference value, and proceeds to Step S105 when the number of times the response action has not been performed is lower than the reference value.

In Step S104, the response action control unit 9 sets an approval flag to "false" because the number of times the response action has not been performed is equal to or larger than the reference value. By this flag, the response action control unit 9 determines that the driver has not approved of the autonomous driving control, and performs control for stopping the autonomous driving control. The response action control unit 9 also determines that the driver is not ready to take over when the autonomous driving control is switched to the manual driving control. In addition, the response action control unit 9 inputs, to the self-vehicle behavior determination unit 27, an indication that the approval flag has been set to "false".

When the approval flag is thus set to "false", the response action control loop according to the present embodiment ends.

In Step S105, the response action determination unit 7 determines a response action to request from the driver. More specifically, the response action determination unit 7 acquires, from the self-vehicle behavior generating unit 25, a plurality of self-vehicle behavior candidates as well as safe travelable area information and obstacle location information. From the self-vehicle behavior candidates thus acquired, the response action determination unit 7 determines a response action to present to the driver. Examples of a driving operation that is requested from the driver as a response action include turning right or left, passing, changing to the left or right lane, speeding up or down, merging, stopping, starting, temporarily stopping, and following the vehicle in front. These driving operations requested from the driver are feasible driving operations in consideration of the surroundings. Driving operations considered rational in view of the entire itinerary of the own vehicle are set as options for the response action.

Next, in Step S106, the response action control unit 9 determines the timing to request the response action from the driver. Specifically, the response action control unit 9 acquires, from the driver analyzing unit 3, an analysis result of the state of the driver as well as the vehicle information, and acquires, from the driver response recording unit 5, timing when a previous response action is performed and information of elapsed time. The response action control unit 9 also acquires the safe travelable area information and the obstacle location information from the response action determination unit 7, and acquires information regarding cruise control from the autonomous driving system of the own vehicle. Based on these pieces of information, the response action control unit 9 determines timing to request the response action from the driver.

For example, the response action control unit 9 requests the driver to perform a response action every time a predetermined period of time passes or every time the own vehicle performs a predetermined number of cruise control operations. The response action control unit 9 may set the timing to request the response action from the driver based on the state of the driver. For example, if it is detected that the driver is not awake or is not watching ahead, the response action control unit 9 requests the driver to perform a response action. The response action control unit 9 may also set the timing to request a response action from the driver based on a result of analysis on a manual driving operation performed by the driver. For example, the manual driving operation performed by the driver is analyzed, if the driver has high levels of conscious, driving accuracy, and driving stability, the response action control unit 9 increases the period of time that elapses before requesting the response action, and if the driver has low levels of conscious, driving accuracy, and driving stability, the response action control unit 9 decreases the period of time that elapses before requesting the response action. Similarly, the response action control unit 9 increases the period of time that elapses before requesting the response action if the driver has a high level of fatigue, and decreases the period of time that elapses before requesting the response action if the driver has a low level of fatigue.

The response action control unit 9 may also set the timing to request a response action from the driver based on the traveling conditions and outside circumstances of the own vehicle. For example, the response action control unit 9 sets the timing to request the response action based on, for example, the speed of the own vehicle, the amount of traffic, or whether the own vehicle is travelling on a highway or not. However, if the driver performs the manual driving control voluntarily or manually drives the vehicle by being prompted by information from the autonomous driving system, such manual driving operation can be regarded as an equivalent to a response action as long as the manual driving has been performed safely. After the driver manually drives, the response action control unit 9 delays the timing to request a response action from the driver or reduces the number of response action requests.

When the timing to switch from the autonomous driving control to the manual driving control is predetermined, the response action control unit 9 shortens the interval of requesting a response action from the driver as the predetermined timing approaches. For example, if the autonomous driving control is switched to the manual driving control when the vehicle exits a highway to take local roads, the response action control unit 9 shortens the interval of requesting a response action from the driver as timing to exit the highway approaches.

Next, in Step S107, the response action control unit 9 determines whether or not the response-action request timing determined in Step S106 has come. If the response-action request timing has not come yet, the response action control unit 9 keeps determining whether or not the response-action request timing has come. If the timing to request for the response action has come, the response action control unit 9 proceeds to Step S108.

In Step S108, the response action control unit 9 requests the driver to perform the response action. Specifically, through an image on the display device 33 and a message from the speaker 37, the response action control unit 9 asks the driver whether or not to perform the driving operation determined by the response action determination unit 7 and prompts the driver to operate the button. For example, the response action control unit 9 asks the driver a question such as "Do you want to change to the right lane?" or "Do you want to speed up?" In response to this, the driver operates the button switch 31 and thereby performs the response action.

A specific example of processing performed in requesting the driver to perform a response action is now described. In this example, the driver is requested to perform a response action about changing to the right lane when the own vehicle is under the autonomous cruising while following the vehicle in front with a certain inter-vehicle gap maintained.

The response action control unit 9 asks the driver "Do you want to change to the right lane?" with the message displayed on the display device 33 and audio coming from the speaker 37 at the same time. In a case where the button switch 31 only has a YES button, if the driver operates the YES button, it is determined that the driver has performed the response action. If the button is not operated, it may be determined that the driver has not performed the response action. In this case, a driving operation set by default, e.g., following the vehicle in front, may be performed.

In a case where the button switch 31 has a YES button and a NO button, if the driver operates the YES button, it is determined that the driver has performed the response action, and if the driver operates the NO button, it is determined that the driver has not performed the response action. If neither of the buttons is operated, it may be determined that the driver has not performed the response action. In this case, a driving operation set by default, e.g., following the vehicle in front, may be performed.

In a case where the button switch 31 has only a NO button, it is determined that the driver has performed the response action if the driver does not operate the NO button, and it is determined that the driver has not performed the response action if the driver operates the NO button.

In the above case where it is determined that a response action has been performed without any button being operated, the own vehicle may continue to autonomously drive although the button is not operated. To avoid the situation where the vehicle continues to autonomously drive with the driver ignoring the request and not operating the button, the response action control unit 9 gives the driver a question to which button operation is inevitable. Such a question is called a trap trial herein, and is asked if the button has not been operated at a predetermined frequency or a predetermined number of times in a row, for example. In a case where the button switch 31 has only a YES button, the response action control unit 9 asks a question such as "Red light ahead. Do you want to stop?". Not operating the button is an inappropriate reaction to this question, so the driver has to operate the button. When the button switch 31 is only a NO button, the response action control unit 9 asks a question such as "Do you want to stop on the crosswalk?" This question proposes a driving operation which is clearly inappropriate. Not operating the No button would be an inappropriate reaction, so the driver has to operate the button. For the case where there are both the YES button and the NO button, a question for the case of only a NO button is asked.

If the driver does not operate the button in response to such trap trials, the response action control unit 9 determines that the driver is ignoring the request to perform a response action or is in a state incapable of performing the response action, and warns the driver by sounding an alert and blinking the display screen.

Figure 4:
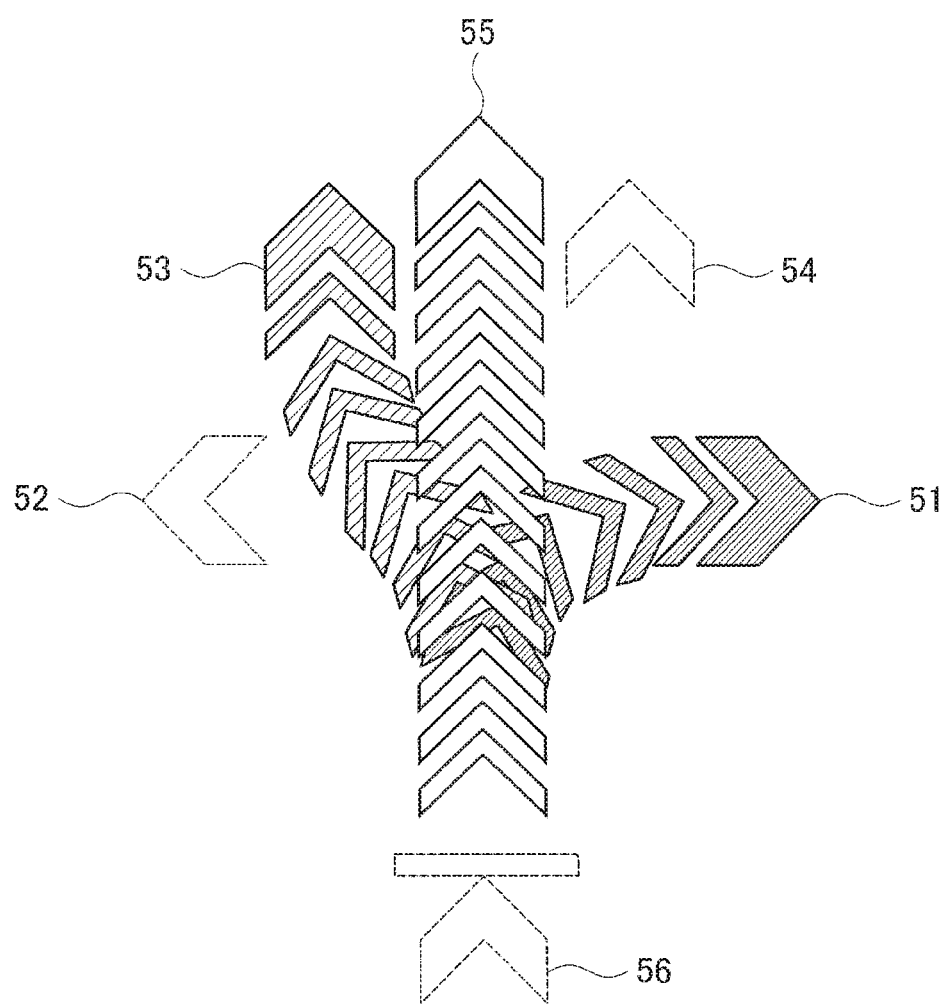
FIG. 4 is a diagram illustrating an example of an image displayed by the information presenting apparatus according to the first embodiment of the present invention when requesting the driver to perform a response action.

In requesting to perform a response action by asking such questions as above described, the response action control unit 9 may display pictograms as shown in FIG. 4. In the pictograms shown in FIG. 4, reference numeral 51 indicates turning right, 52 turning left, 53 changing to the left lane, 54 changing to the right lane, 55 going straight (starting or following the car in front), and 56 stopping. In FIG. 4, the pictograms shown in dotted lines (such as turning left 52 and changing to the right lane 54) are driving operations not selectable by the driver because those driving operations are determined by the autonomous driving system as infeasible based on the overall itinerary and the surroundings. The outlined white pictogram (going straight 55) is a driving operation currently being performed. The thickly shaded pictogram (turning right 51) is a driving operation instructed by the autonomous driving system. The thinly shaded pictogram (changing to the left lane 53) is a driving operation which is feasible in view of the surroundings, but has not been selected as the response action.

Figure 5:
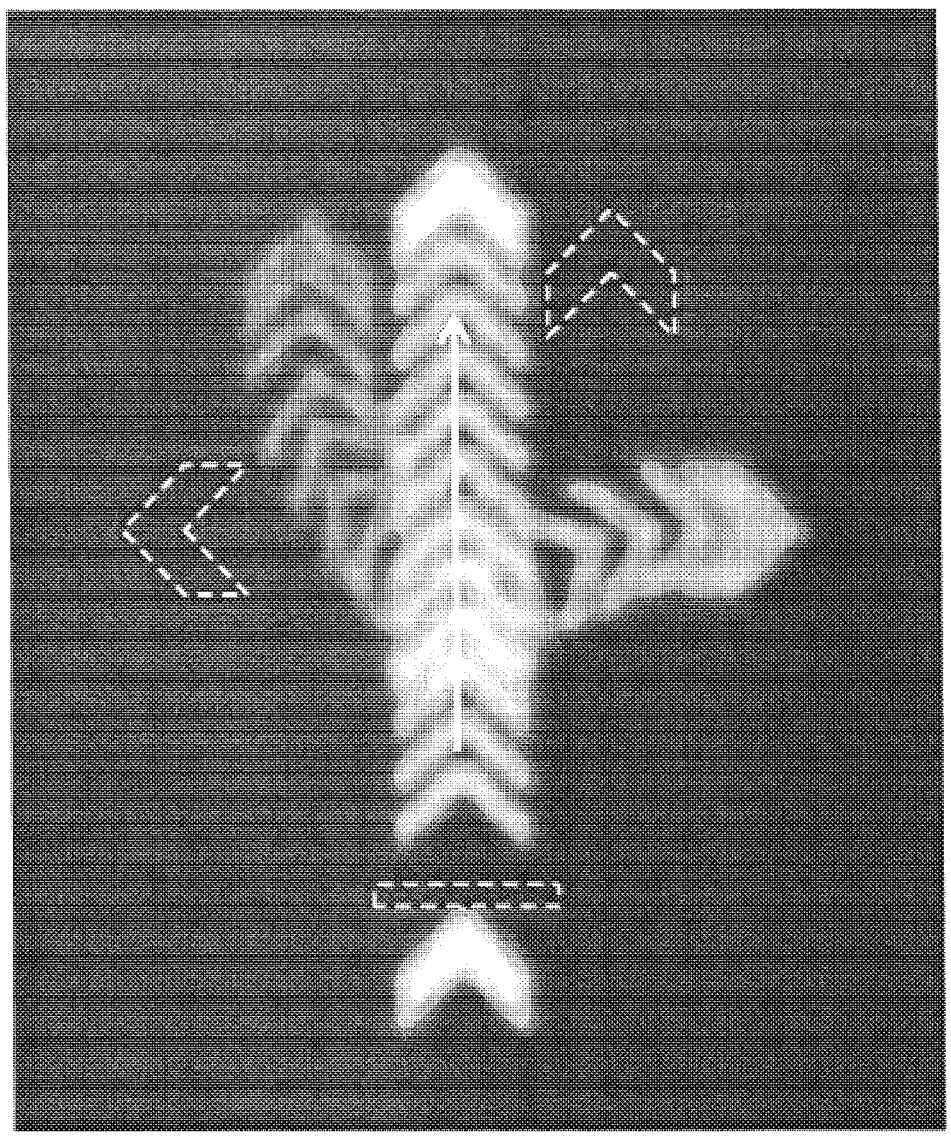
FIG. 5 is a diagram illustrating an example of an image displayed by the information presenting apparatus according to the first embodiment of the present invention when requesting the driver to perform a response action.

The response action control unit 9 may process the pictograms shown in FIG. 4 so that they can be recognized by peripheral vision as shown in FIG. 5. In this case, the response action control unit 9 displays a pattern formed by spatial-frequency and temporal-frequency having no luminance edge. For example, the response action control unit 9 displays, on the display device 33, a pattern formed chiefly by components at a spatial-frequency of not larger than 1 CPD (cycle per degree) and at a temporal-frequency of 1 Hz to 7 Hz. The driver can thereby recognize the response action by peripheral vision without directly looking at the display device 33.

In each pictogram image shown in FIG. 5, mountain-shaped elements constituting the pictogram image smoothly move from down to up, forming a continuous flow. Since the flowing motion of the pictogram image can easily guide driver's eye, low-pass filtering processing is performed on the entire image to eliminate high spatial-frequency components.

In FIG. 5, the response action control unit 9 set a velocity of the pictogram as follows. The pictogram representing the driving operation currently being performed flows at a relatively high speed, the pictogram representing the driving operation as a response action flows at a slower speed, and the pictogram representing a default driving operation flows at the slowest speed. By thus adding flowing motions to the pictograms, the pictograms can be distinguished based on multiple attributes such as color, flow speed and direction, and contrast and the like. Since the pictograms are blurred by image processing, the driver can distinguish, by peripheral vision, the driving operation currently being performed, the driving operation as a response action, and the driving operation set by default, without fixing his or her eyes. For more information, refer to, for example, Japanese Patent Application Publication No. 2006-184854 and Funakawa, Masami. Ambient Information Display Method Based upon Spatio-temporal Properties of Driver's Field of View. AUTOMOTIVE ENGINEERING AND TECHNOLOGIES 40, 5, 1191-1196. The pictogram representing the driving operation as a response action may repeat blinking instead of flowing. This allows easier discrimination than using different speeds of flow. If the pictogram blinks in a way that its contrast changes as square waves, the blinking may annoy the driver and guide his or her eye. It is therefore preferable that the pictogram blink in a way that its contrast changes smoothly as sine waves.

In synchronization with the images displayed on the display device 33, the response action control unit 9 may provide sensory stimulation to the driver. For example, the response action control unit 9 may provide the driver with vibratory stimulation through, e.g., the steering wheel, or with a sound effect. This assures that the driver will feel that information is being provided.

In Step S109, the response action control unit 9 compares the button operation performed by the driver with the response action requested from the driver, and determines whether the driver has performed the response action or not. Specific processing for determining whether the response action has been performed will be described later with reference to FIG. 6.

When determining that the driver has not performed the response action in Step S109, the response action control unit 9 proceeds to Step S110. In Step S110, the response action control unit 9 inputs, to the driver response recording unit 5, an indication that the response action has not been performed, and proceeds back to Step S101.

When determining that the driver has performed the response action in Step S109, the response action control unit 9 proceeds to Step S111. In Step S111, the response action control unit 9 inputs, to the driver response recording unit 5, an indication that the response action has been performed, and proceeds to Step S112.

In Step S112, the response action control unit 9 sets the approval flag to "true". Thereby, the response action control unit 9 determines that the driver has approved of the autonomous driving control, and performs control so that the autonomous driving control may continue. In addition, the response action control unit 9 determines that the driver is ready to take over when the autonomous driving control is switched to the manual driving control. The response action control unit 9 also inputs, to the self-vehicle behavior determination unit 27, an indication that the approval flag has been set to "true".

When the approval flag is thus set to "true", the response action control loop according to the present embodiment ends.

[Procedure of Response Action Performance Determination Processing]

Next, a procedure of response action performance determination processing performed in Step S109 of the response action control loop described above is set forth with reference to the flowchart in FIG. 6.

Figure 6:
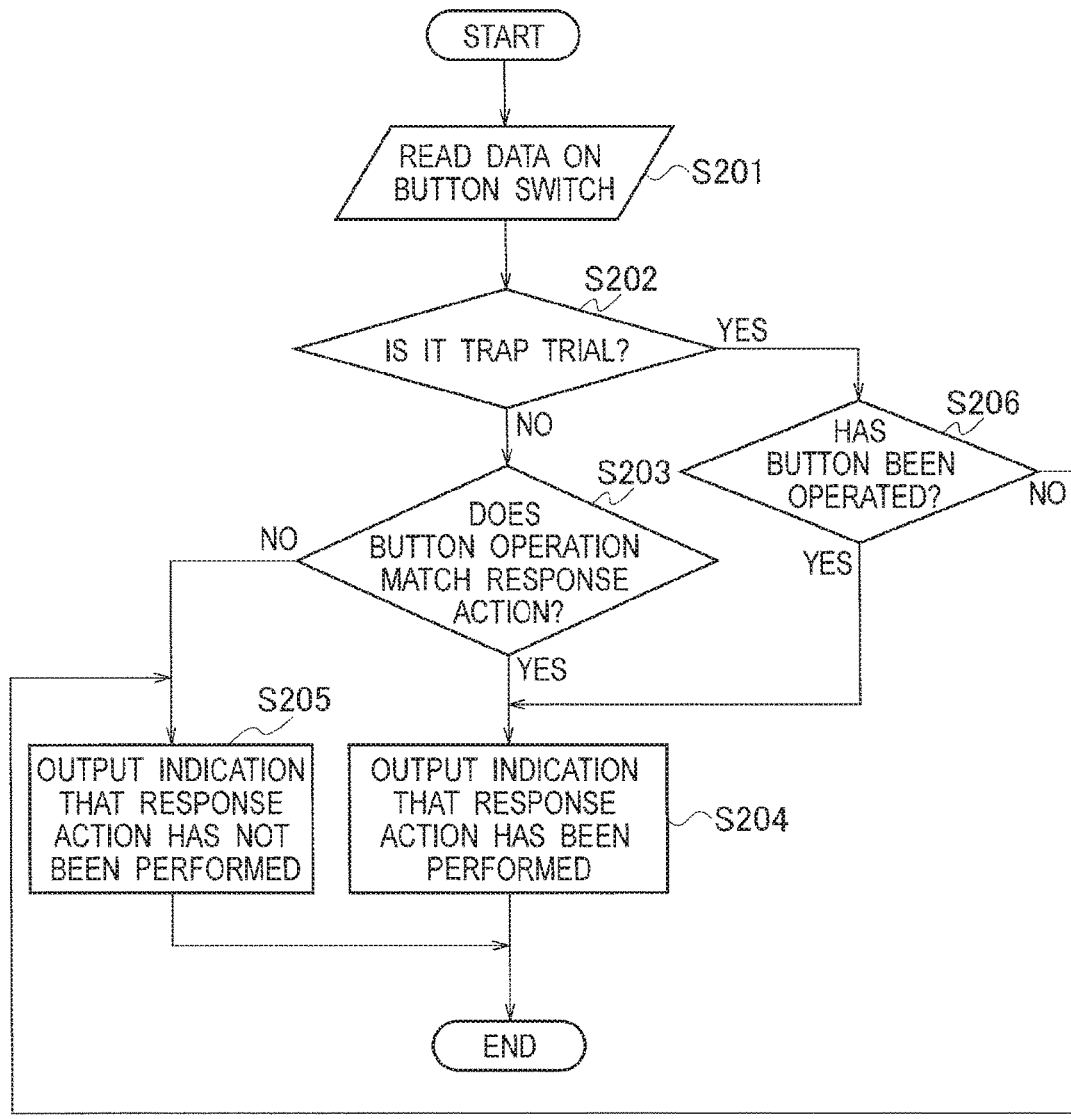
FIG. 6 is a flowchart showing a procedure of response action performance determination processing performed by the information presenting apparatus according to the first embodiment of the present invention.

As shown in FIG. 6, in Step S201, the response action control unit 9 reads data indicating a detected operation on the button switch 31 from the driver analyzing unit 3, so that the response action control unit 9 can recognize an operation performed by the driver on the button switch 31.

In Step S202, the response action control unit 9 determines whether the response action requested from the driver is a trap trial or not. The response action control unit 9 proceeds to Step S203 if it is not a trap trial, and proceeds to Step S206 if it is a trap trial.

In Step S203, the response action control unit 9 compares the driver's operation on the button switch 31 with the response action determined in S105, and determines whether the operation on the button switch 31 matches the response action or not. When the operation on the button switch 31 matches the response action, the response action control unit 9 proceeds to Step S204. In Step S204, the response action control unit 9 outputs an indication that the response action has been performed, and determines that the driver is ready to take over when the autonomous driving control is switched to the manual driving control.

When the operation on the button switch 31 does not match the response action in Step S203, the response action control unit 9 proceeds to Step S205. In Step S205, the response action control unit 9 outputs an indication that the response action has not been performed, and determines that the driver is not ready to take over when the autonomous driving control is switched to the manual driving control.

In Step S206 to which the response action control unit 9 proceeds after determining in Step S202 that the response action requested from the driver is a trap trial, the response action control unit 9 determines whether the driver has operated the button switch 31 or not. When the response action is the trap trial, the question operating the button switch 31 inevitably is given. Thus, if the button switch 31 has been operated, the response action control unit 9 proceeds to Step S204 to output an indication that the response action has been performed. If it is determined in Step S206 that the button switch 31 has not been operated despite the trap trial, the response action control unit 9 proceeds to Step S205 to output an indication that the response action has not been performed.

After outputting the indication that the response action has or has not been performed, the response action control unit 9 ends the response action performance determination processing, and proceeds back to the response action control loop.

[Procedure of the Autonomous Driving Control Loop]

Next, a procedure of an autonomous driving control loop performed by the information presenting apparatus 1 according to the present embodiment is described with reference to the flowchart in FIG. 7.

Figure 7:
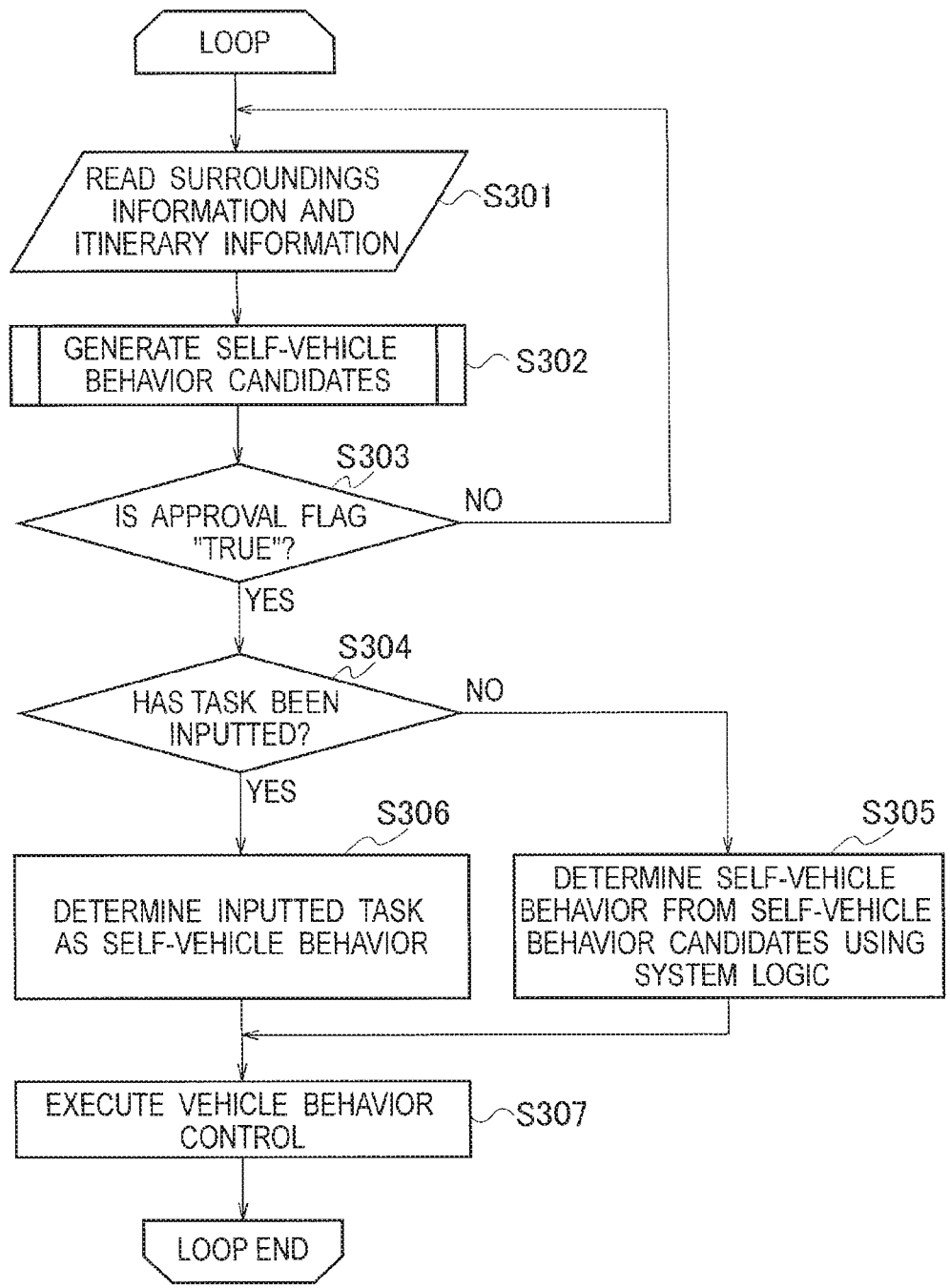
FIG. 7 is a flowchart showing a procedure of an autonomous driving control loop performed by the information presenting apparatus according to the first embodiment of the present invention.

As shown in FIG. 7, in Step S301, the self-vehicle behavior generating unit 25 reads surroundings information from the surroundings recognizing unit 21, and itinerary information from the itinerary control unit 23.

In Step S302, the self-vehicle behavior generating unit 25 generates a self-vehicle behavior candidate in accordance with system logic of a typical autonomous driving system. The self-vehicle behavior candidates are generated more than one. These self-vehicle behavior candidates each contain a travelling path of the own vehicle and a speed profile.

The system logic of an autonomous driving system is logic used for determining the self-vehicle behaviors in consideration of driving efficiency and safety. For example, the self-vehicle behavior is determined by prioritizing the shortest route to the destination or, in a heavy traffic area, prioritizing a shorter time rather than distance. On the route, necessary lane changing is performed, but unnecessary lane changing is not performed to place the priority on safety.

According to such system logic, the self-vehicle behavior generating unit 25 generates a travelling path such as turning right, turning left, or going straight, and a speed profile as self-vehicle behavior candidates.

In Step S303, the self-vehicle behavior determination unit 27 determines, based on the input from the response action control unit 9, whether the approval flag is set to "true" or not. When the approval flag is "true", the self-vehicle behavior determination unit 27 determines that the driver approves that the autonomous driving control is to be continued, and proceeds to Step S304. When the approval flag is not "true", the self-vehicle behavior determination unit 27 proceeds back to Step S301.

In Step S304, the self-vehicle behavior determination unit 27 determines whether the driver has inputted a task through the task input unit 11 or not. The self-vehicle behavior determination unit 27 proceeds to Step S305 when no task has been inputted, and proceeds to Step S306 when a task has been inputted.

In Step S305, the self-vehicle behavior determination unit 27 determines a self-vehicle behavior in accordance with the system logic of the autonomous driving system, because no task has been inputted by the driver. The self-vehicle behavior determination unit 27 determines a self-vehicle behavior among the self-vehicle behavior candidates generated by the self-vehicle behavior generating unit 25, in accordance with the system logic.

For example, since the system logic of the autonomous driving system determines a self-vehicle behavior in consideration of driving efficiency and safety, the system logic determines a self-vehicle behavior by prioritizing the shortest route to the destination when the traffic is not heavy, and determines a self-vehicle behavior by prioritizing a shorter time rather than distance when the traffic is heavy.

The self-vehicle behavior determination unit 27 thus determines, as a self-vehicle behavior, a travelling path, such as turning right, turning left, or going straight, and its speeding profile, and proceeds to Step S307.

In Step S306, the self-vehicle behavior determination unit 27 determines, as a self-vehicle behavior, the task inputted by the driver through the task input unit 11. The self-vehicle behavior determination unit 27 then records, in the driver response recording unit 5, that the task inputted by the driver has been determined as the self-vehicle behavior, and proceeds to Step S307.

In Step S307, the vehicle behavior control unit 29 executes the self-vehicle behavior determined in Step S305 or Step S306. Specifically, vehicle behavior control unit 29 executes either the self-vehicle behavior determined according to the system logic in Step S305, or the task determined in S306, which is inputted by the driver. The vehicle behavior control unit 29 executes the self-vehicle behavior by outputting control signals necessary for performing the self-vehicle behavior to the actuators 45. The vehicle behavior control unit 29 also inputs the executed self-vehicle behavior to the driver analyzing unit 3.

When the self-vehicle behavior is thus executed, the information presenting apparatus 1 according to the present embodiment ends the autonomous driving control loop.

[Advantageous Effects of the First Embodiment]

As described above, the information presenting apparatus 1 according to the present embodiment requests the driver to perform a response action to check whether the driver is ready to take over when the autonomous driving control is switched to the manual driving control. By thus checking whether the driver is ready to take over when the autonomous driving control is switched to the manual driving control, the autonomous vehicle can continue safe traveling even if the autonomous driving control is switched to the manual driving control.

In the information presenting apparatus 1 according to the present embodiment, a response action is an action in which the driver responds to a request, for making a decision about a driving operation of the autonomous vehicle. The information presenting apparatus 1 can thereby easily check that the driver is ready to take over when the autonomous driving control is switched to the manual driving control.

The information presenting apparatus 1 according to the present embodiment receives only an affirmative response from the driver, and therefore needs only a button for receiving an affirmative input. This eliminates the need for multiple buttons, allowing simplification in configuration.

Alternatively, the information presenting apparatus 1 according to the present embodiment receives only a negative response from the driver, and therefore needs only a button for receiving a negative input. This eliminates the need for multiple buttons, allowing simplification in configuration.

Alternatively, the information presenting apparatus 1 according to the present embodiment receives both an affirmative response and a negative response from the driver. The information presenting apparatus 1 thus always receives a response regardless of whether the response is affirmative or negative, and can therefore grasp the driver's intentions for certain.

When the frequency of a response action is below a predetermined frequency, the information presenting apparatus 1 according to the present embodiment asks the driver a question to which a response is inevitable. This can prevent the vehicle to continue autonomous driving without a response action being performed, and therefore improve safety of the autonomous vehicle.

The information presenting apparatus 1 according to the present embodiment uses button operation by the driver as a response action, and therefore can receive a decision of the driver easily.

The information presenting apparatus 1 according to the present embodiment stops the autonomous driving control when the driver fails to perform the response action, and therefore can ensure safety of the autonomous vehicle.

The information presenting apparatus 1 according to the present embodiment requests to perform a response action every time a predetermined period of time passes or every time the autonomous vehicle performs a predetermined number of cruise control operations. Since the driver is thus periodically requested to perform a response action, safety can be improved in the autonomous driving control.

The information presenting apparatus 1 according to the present embodiment requests the driver to perform a response action when detecting that the driver is not awake or is not watching ahead. The information presenting apparatus 1 thus can requests the driver to perform a response action when the driver has a decreased level of consciousness, allowing improvement in the safety of the autonomous vehicle.

The information presenting apparatus 1 according to the present embodiment sets the timing to request the driver to perform a response action, based on the state of the driver and the traveling conditions and outside circumstances of the autonomous vehicle. The information presenting apparatus 1 can therefore request the driver to perform a response action at appropriate timing according to the state of the driver and the traveling conditions and outside circumstances of the autonomous vehicle.

If timing to switch from the autonomous driving control to the manual driving control is preset, the information presenting apparatus 1 according to the present embodiment shortens the interval of requesting to perform a response action as the preset timing approaches. This assures that the driver will be ready to take over when the autonomous driving control is switched to the manual driving control.

If the driver performs a manual driving operation, the information presenting apparatus 1 according to the present embodiment delays the timing to request the driver to perform a response action. This reduces the number of response action requests, decreasing a load on the system and a burden on the driver.

The information presenting apparatus 1 according to the present embodiment displays, when requesting a performance of a response action, a pattern formed by spatial-frequency and temporal-frequency having no luminance edge. This allows the driver to recognize the request for a response action not by directly looking at the display device 33, but by peripheral vision.

When requesting a response action, the information presenting apparatus 1 according to the present embodiment provides the driver with sensory stimulation in synchronization with displaying an image. This assures that the driver notices a request for a response action.

[Second Embodiment]

Next, an information presenting apparatus according to a second embodiment of the present invention is described with reference to the drawings. The same components in the first and second embodiments are denoted by the same reference numerals, and are not described again in detail below.

[Configuration of the Information Presenting Apparatus]

The information presenting apparatus according to the first embodiment above requests the driver to operate a button as a response action. Instead, the information presenting apparatus according to the present embodiment requests the driver to make a decision about a driving operation of the own vehicle and respond to the request by speaking.

Figure 8:
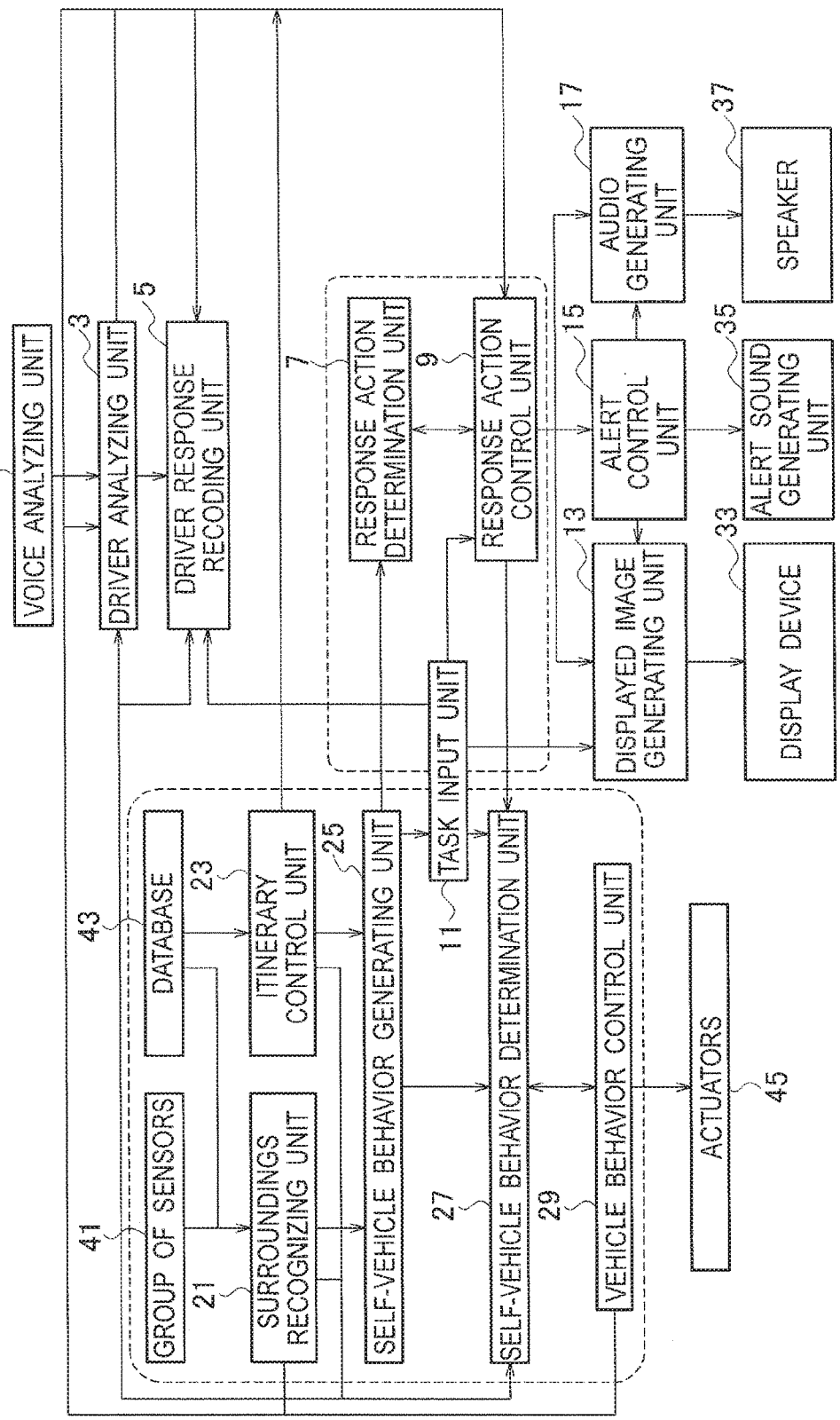
FIG. 8 is a block diagram showing the configuration of an information presenting apparatus according to a second embodiment of the present invention.

FIG. 8 is a block diagram showing the configuration of the information presenting apparatus according to the present embodiment. As shown in FIG. 8, an information presenting apparatus 81 according to the present embodiment differs from that of the first embodiment in having a voice analyzing unit 83 instead of the button switch 31. The difference from the first embodiment is described below.

The voice analyzing unit 83 acquires voice spoken by the driver through, e.g., a microphone, and analyzes the voice. The voice analyzing unit 83 then detects what kind of words the driver has spoken and outputs voice information. The voice analyzing unit 83 also analyzes, for example, the speed, tone, and pitch variation of the voice of the driver.

The driver analyzing unit 3 detects the word(s) spoken by the driver based on the voice information outputted by the voice analyzing unit 83 and analyzes the content of the speech or conversation by the driver.

The driver response recording unit 5 records the voice information outputted by the voice analyzing unit 83 and records a result of the analysis by the driver analyzing unit 3, i.e., the content of the speech or conversation by the driver.

The response action determination unit 7 determines a response action for checking whether the driver of the vehicle is ready to take over when the autonomous driving control is switched to the manual driving control. In the present embodiment, the response action determination unit 7 requests, as a response action, the driver to make a decision about a driving operation of the autonomous vehicle and respond by speaking. A specific method of determining the response action is the same as that in the first embodiment.

The response action control unit 9 includes a conversation system for having a conversation with the driver. The conversation system can have a conversation with the driver about the surroundings and driving operations by asking the driver questions and answering words of the driver. As for setting the timing to request a response action, the response action control unit 9 shortens the interval of requesting the driver to perform a response action when the driver makes an inappropriate speech or dialogue.

[Procedure of the Response Action Control Loop]

Next, a procedure of a response action control loop performed by the information presenting apparatus 81 according to the present embodiment is described. The response action control loop of the present embodiment is the same as the flowchart in the first embodiment shown in FIG. 3. Thus, steps that perform processing different from that in the first embodiment will only be described in detail.

In the flowchart in FIG. 3, after a response action is determined through the processing in Steps S101 to S105, timing to request the response action is determined in Step S106. Then, when the timing to request the response action arrives in Step S107, the response action control unit 9 requests the driver to perform the response action in Step S108. Specifically, the response action control unit 9 asks the driver, through an image on the display device 33 or a message from the speaker 37, whether or not to perform the driving operation determined by the response action determination unit 7 and prompts the driver to speak. For example, the response action control unit 9 asks the driver a question such as "Do you want to change to the right lane?" or "Do you want to speed up?" The driver responds to the question by speaking, and thereby performs the response action. For example, the driver performs the response action by speaking an affirmative word such as "Yes" or a negative word such as "No".

The response action control unit 9 may also ask a trap trial as described in the first embodiment. For example, the response action control unit 9 asks a clearly inappropriate question such as "Do you want to stop on the crosswalk?" to which the driver inevitably speaks a negative word "No". When the driver speaks nothing to the trap trial, the response action control unit 9 determines that the driver is ignoring the request to perform the response action or is in a state incapable of performing the response action, and warns the driver by sounding an alert and blinking the display screen.

Next, in Step S109, the response action control unit 9 determines whether the driver has performed the response action or not. The response action performance determination processing will be described later in detail with reference to FIG. 9.

Thereafter, the processing in Steps S110 to S112 is performed, and the response action control loop according to the present embodiment ends.

[Procedure of the Response Action Performance Determination Processing]

Next, a procedure of the response action performance determination processing performed in Step S109 of the response action control loop described above is set forth with reference to the flowchart in FIG. 9.

Figure 9:
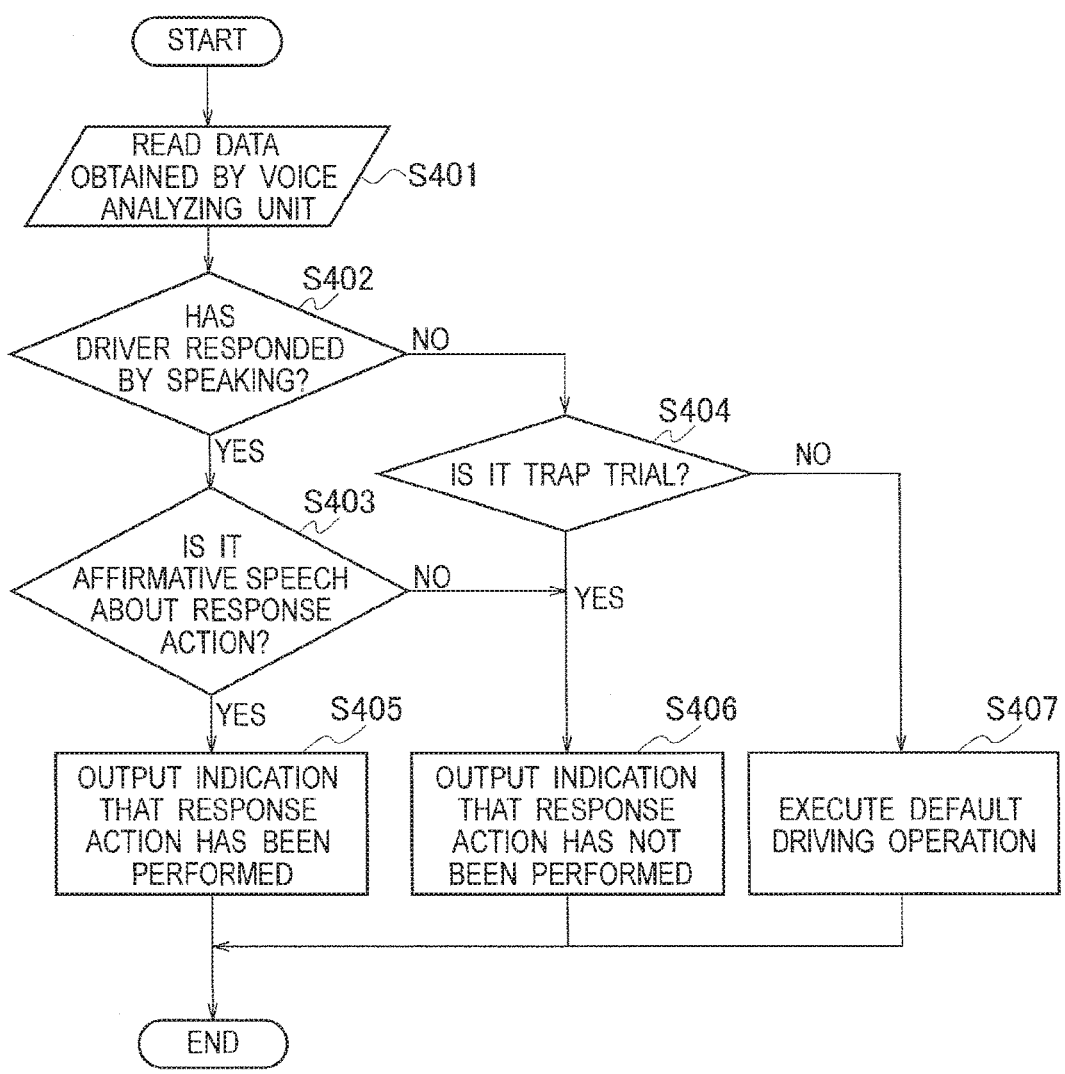
FIG. 9 is a flowchart showing a procedure of response action performance determination processing performed by the information presenting apparatus according to the second embodiment of the present invention.

As shown in FIG. 9, in Step S401, the response action control unit 9 reads data obtained by the voice analyzing unit 83, from the driver response recording unit 5. This data allows the response action control unit 9 to recognize the content of the speech by the driver.

In Step S402, the response action control unit 9 determines whether the driver has spoken or not. The response action control unit 9 proceeds to Step S403 if the driver has spoken, and proceeds to Step S404 if the driver has not spoken.

In Step S403, the response action control unit 9 determines whether the speech by the driver about the response action has been affirmative or not. The response action control unit 9 proceeds to Step S405 if the speech has been affirmative, and proceeds to Step S406 if the speech has not been affirmative.

In Step S405, the response action control unit 9 outputs an indication that the response action has been performed, and determines that the driver is ready to take over when the autonomous driving control is switched to the manual driving control.

In Step S406, the response action control unit 9 executes the self-vehicle behavior determined by the self-vehicle behavior determination unit 27 because the speech by the driver has not been affirmative, and outputs an indication that the response action has not been performed. The response action control unit 9 determines that the driver is not ready to take over when the autonomous driving control is switched to the manual driving control.

In Step 404 to which the response action control unit 9 proceeds after determining in Step S402 that the driver has not spoken, the response action control unit 9 determines whether the response action requested from the driver is a trap trial or not. The response action control unit 9 proceeds to Step S406 if the response action is a trap trial, and proceeds to Step S407 if the response action is not a trap trial.

In Step S406, the response action control unit 9 performs the self-vehicle behavior determined by the self-vehicle behavior determination unit 27 because the driver has not spoken despite the trap trial, and outputs an indication that the response action has not been performed. The response action control unit 9 determines that the driver is not ready to take over when the autonomous driving control is switched to the manual driving control.

In Step S407, the response action control unit 9 performs a default driving operation, such as following the car in front, because the response action is not a trap trial and the driver has not spoken.

After thus outputting an indication that the response action has or has not been performed, the response action control unit 9 ends the response action performance determination processing and returns to the response action control loop.

[Procedure of the Autonomous Driving Control Loop]

The autonomous driving control loop according to the present embodiment is the same as that of the first embodiment, and is therefore not described in detail here.

[Advantageous Effects of the Second Embodiment]

As described in detail above, the information presenting apparatus 81 according to the present embodiment requests, as a response action, the driver to make a decision about a driving operation of the autonomous vehicle and respond by speaking. The information presenting apparatus 81 can thus easily check whether the driver is ready to take over when the autonomous driving control is switched to the manual driving control.

When the frequency of a speech or dialogue by the driver is below a predetermined frequency, the information presenting apparatus 81 according to the present embodiment asks the driver a question which requires the driver to inevitably speak or dialogue. This can prevent the vehicle to continue to drive autonomously without speech or dialogue, thereby improving the safety of the autonomous vehicle.

When the driver makes an inappropriate speech or dialogue, the information presenting apparatus 81 according to the present embodiment shortens the interval of requesting the driver to perform a response action. This assures safety even when the driver makes an inappropriate speech or dialogue.

[Third Embodiment]

Next, an information presenting apparatus according to a third embodiment is described with reference to the drawings. The same components in the first to third embodiments are denoted by the same reference numerals, and are not described again in detail below.

[Configuration of the Information Presenting Apparatus]

The information presenting apparatus according to the second embodiment requests the driver to speak as a response action. Instead, the information presenting apparatus according to the present embodiment requests, as a response action, the driver to dialogue about a driving operation of the autonomous vehicle.

The configuration of the information presenting apparatus according to the present embodiment is the same as that of the second embodiment shown in FIG. 8, and is therefore not described again in detail here.

[Procedure of the Response Action Control Loop]

Next, a procedure of the response action control loop performed by the information presenting apparatus according to the present embodiment is described. The response action control loop of the present embodiment is the same as the flowchart in the first embodiment shown in FIG. 3. Thus, steps that perform processing different from that in the first and second embodiments will only be described in detail.

In the flowchart in FIG. 3, after a response action is determined through the processing in Steps S101 to S105, timing to request the response action is determined in Step S106. Then, when the timing to request the response action arrives in Step S107, the response action control unit 9 requests the driver to perform the response action in Step S108. Specifically, the response action control unit 9 asks the driver, through an image on the display device 33 and a message from the speaker 37, whether or not to perform the driving operation determined by the response action determination unit 7 and prompts the driver to dialogue. For example, if there is a vehicle travelling slowly in front, the response action control unit 9 asks "There is a slow car in front". The driver replies to this by saying "Yes" or something. The response action control unit 9 then makes a suggestion such as "Do you want to change to the right lane and pass the front car, or do you want to slow down?" The driver replies by making an affirmative reply such as "I'll pass the car." or "I'll slow down." and thereby performs the response action.

Before requesting to perform the response action, the response action control unit 9 performs a dialogue about the surroundings. For example, the response action control unit 9 performs a dialogue by asking something like "The weather seems to be bad at the destination," "It's started to rain," or "Traffic seems to be flowing smoothly." The driver performs the dialogue by saying something like "Does the weather forecast say it'll snow?", "Let's just keep going.", or "What time will I get there?" in response to those questions.

The response action control unit 9 may also ask a trap trial as described in the first embodiment. For example, the response action control unit 9 asks a clearly inappropriate question such as "Do you want to stop on the crosswalk?" to which the driver inevitably replies with a negative word "No". When the driver does not reply to the trap trial, the response action control unit 9 determines that the driver is ignoring the request to perform the response action or is in a state incapable of performing the response action, and warns the driver by sounding an alert and blinking the display screen.

Next, in Step S109, the response action control unit 9 determines whether the driver has performed the response action or not. The response action performance determination processing will be described later in detail with reference to FIG. 10.

Thereafter, the processing in Steps S110 to S112 is performed, and the response action control loop according to the present embodiment ends.

[Procedure of the Response Action Performance Determination Processing]

Next, a procedure of response action performance determination processing performed in Step S109 of the response action control loop described above is set forth with reference to the flowchart in FIG. 10.

Figure 10:
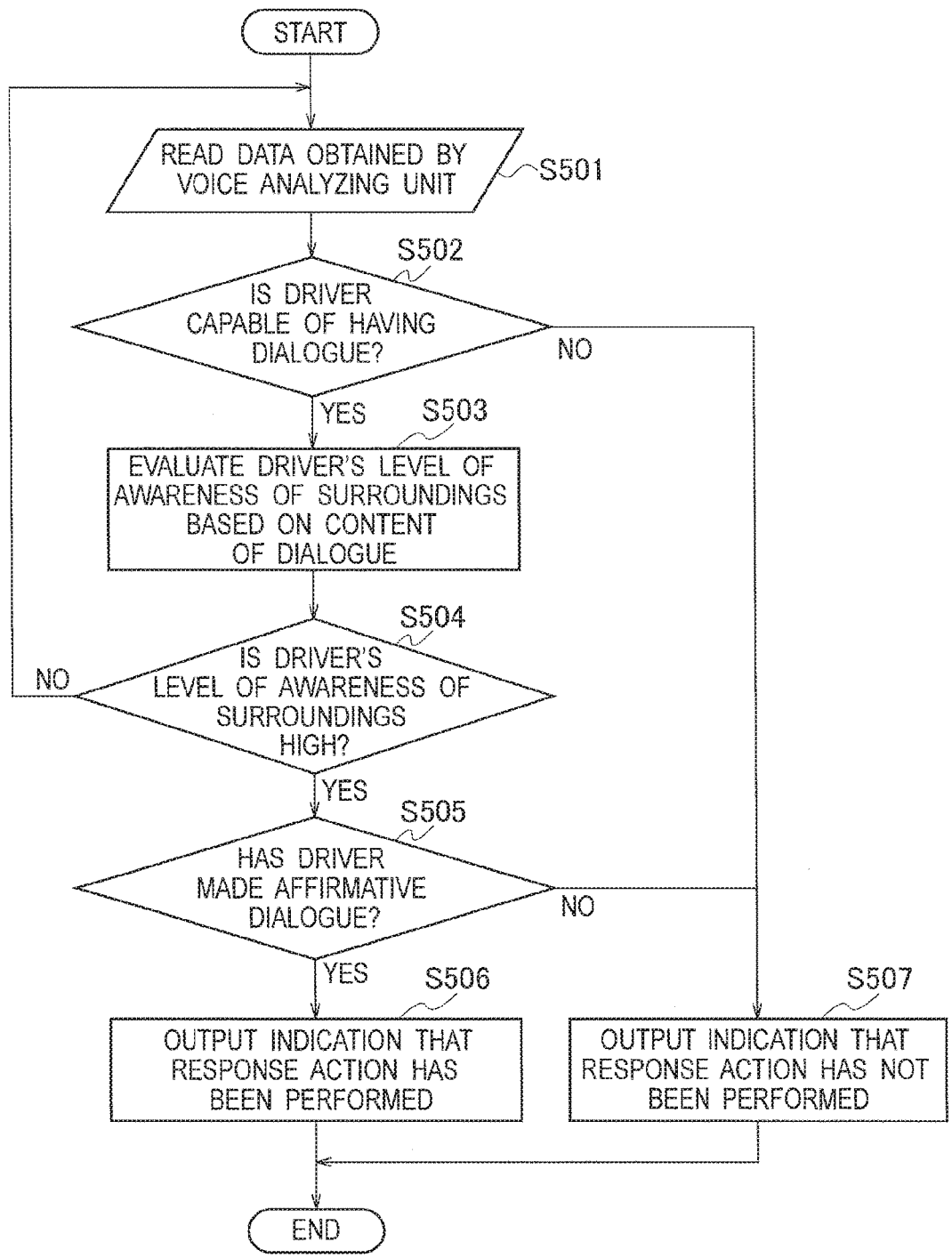
FIG. 10 is a flowchart showing a procedure of response action performance determination processing performed by an information presenting apparatus according to a third embodiment of the present invention.

As shown in FIG. 10, in Step S501, the response action control unit 9 reads data obtained by the voice analyzing unit 83, from the driver response recording unit 5. This data allows the response action control unit 9 to recognize the content of a dialogue by the driver.

In Step S502, the response action control unit 9 determines, based on the content of the dialogue recognized in Step S501, whether the driver is capable of having a dialogue or not. The response action control unit 9 proceeds to Step S503 when the driver is capable of having a dialogue, and proceeds to Step S507 when the driver is not capable of having a dialogue.

In Step S503, based on the content of the dialogue recognized in Step S501, the response action control unit 9 evaluates the driver's level of awareness of the surroundings. For example, if the driver has had usual dialogue about the surroundings, the response action control unit 9 evaluates that the driver has a high level of awareness of the surroundings. If the driver has not responded to the dialogue or has had an inappropriate dialogue, the response action control unit 9 determines that the driver has a low level of awareness of the surroundings.

In Step S504, the response action control unit 9 determines whether the driver has a high level of awareness of the surroundings or not. The response action control unit 9 proceeds to Step S505 when the driver has a high level of awareness of the surroundings, and proceeds back to S501 to repeat a dialogue when the driver has a low level of awareness of the surroundings.

In Step S505, the response action control unit 9 analyzes the content of the dialogue by the driver and determines whether the driver has made an affirmative dialogue regarding the response action or not. The response action control unit 9 proceeds to Step S506 when the driver has made an affirmative dialogue, and proceeds to Step S507 when the driver has not made an affirmative dialogue.

In Step S506 to which the response action control unit 9 proceeds after determining that the driver has made an affirmative dialogue, the response action control unit 9 outputs an indication that the response action has been performed, and determines that the driver is ready to take over when the autonomous driving control is switched to the manual driving control.

On the other hand, in Step S507 to which the response action control unit 9 proceeds after determining that the driver is incapable of having a dialogue or that the driver has not made an affirmative dialogue, the response action control unit 9 outputs an indication that the response action has not been performed, and determines that the driver is not ready to take over when the autonomous driving control is switched to the manual driving control.

After thus outputting an indication that the response action has or has not been performed, the response action control unit 9 ends the response action performance determination processing and returns to the response action control loop.

[Procedure of the Autonomous Driving Control Loop]

The autonomous driving control loop according to the present embodiment is the same as that of the first embodiment, and is therefore not described in detail here.

[Advantageous Effects of the Third Embodiment]

As described in detail above, the information presenting apparatus according to the present embodiment requests the driver to dialogue about a driving operation of the autonomous vehicle as a response action. The information presenting apparatus can thus easily check whether the driver is ready to take over when the autonomous driving control is switched to the manual driving control.

The information presenting apparatus according to the present embodiment repeats a dialogue when determining, based on the dialogue with the driver, that the driver has a low level of awareness of the surroundings. Since repeating dialogue elevates the driver's level of awareness of the surroundings, it is possible to make the driver ready to take over when the autonomous driving control is switched to the manual driving control.

When the frequency of a speech or dialogue by the driver is below a predetermined frequency, the information presenting apparatus according to the present embodiment asks the driver a question to which speech or dialogue is inevitable. This can prevent the vehicle to continue to autonomously drive without speech or dialogue, thereby improving the safety of the autonomous vehicle.

When the driver makes an inappropriate speech or dialogue, the information presenting apparatus according to the present embodiment shortens the interval of requesting the driver to perform a response action. This assures safety even if the driver has made an inappropriate speech or dialogue.

Note that the above embodiments are mere examples of the present invention. Thus, the present invention is not limited to these embodiments, and can be modified variously according to design as long as such embodiments do not depart from the technical scope of the present invention.

REFERENCE SIGNS LIST 1, 81 information presenting apparatus
3 driver analyzing unit
5 driver response recording unit
7 response action determination unit
9 response action control unit
11 task input unit
13 displayed image generating unit
15 alert control unit
17 audio generating unit
21 surroundings recognizing unit
23 itinerary control unit
25 self-vehicle behavior generating unit
27 self-vehicle behavior determination unit
29 vehicle behavior control unit
31 button switch
33 display device
35 alert sound generating unit
37 speaker
41 group of sensors
43 database
45 actuators
83 voice analyzing unit

The invention claimed is:

1. An information presenting apparatus for use in an autonomous vehicle capable of switching between autonomous driving control and manual driving control, in which the vehicle is driven by a driver, the information presenting apparatus comprising:
a memory; and
a processor configured to execute instructions stored in the memory to:
determine a response action to be performed by the driver of the autonomous vehicle, wherein
the response action being indicative of a driving operation of the autonomous driving control, and
the driving operation being selected from a plurality of self-vehicle behavior candidates of the autonomous driving control;
perform control for requesting the driver to perform the response action;
detect whether the driver performed the response action;
in response to detecting that the response action is not performed by the driver:
set a flag indicating that the driver is not ready take over when the autonomous driving control is switched to the manual driving control; and
in response to detecting that the response action is performed by the driver:
set the flag indicating that the driver is ready to take over when the autonomous driving control is switched to the manual driving control; and
maintain the autonomous driving control of the autonomous vehicle, wherein performance, by the driver, of the response action, is indicative of an approval of the driver of the continuance of the autonomous driving, and when a point to switch from the autonomous driving control to the manual driving control is predetermined, the processor shortens an interval for requesting the driver to perform the response action as the predetermined point approaches.

2. The information presenting apparatus according to claim 1, wherein the processor is configured to execute instructions stored in the memory to receive only an affirmative response from the driver.

3. The information presenting apparatus according to claim 1, wherein the processor is configured to execute instructions stored in the memory to receive only a negative response from the driver.

4. The information presenting apparatus according to claim 1, wherein the processor is configured to execute instructions stored in the memory to receive both an affirmative response and a negative response from the driver.

5. The information presenting apparatus according to claim 1, wherein the processor is further configured to execute instructions stored in the memory to:
on condition that a frequency of the response action is below a predetermined frequency, ask the driver a question to which a response is inevitable.

6. The information presenting apparatus according to claim 1, wherein the response action is a button operation by the driver.

7. The information presenting apparatus according to claim 1, wherein the response action is a response speech by the driver.

8. The information presenting apparatus according to claim 7, wherein when a frequency of the speech or a dialogue by the driver is below a predetermined frequency, a question to which the speech or the dialogue is inevitable is asked to the driver.

9. The information presenting apparatus according to claim 7, wherein the processor is configured to execute instructions stored in the memory to shorten an interval of requesting the driver to perform the response action when the driver makes an inappropriate speech or dialogue.

10. The information presenting apparatus according to claim 1, wherein the response action is a dialogue with the driver.

11. The information presenting apparatus according to claim 10, wherein when the driver has a low level of awareness of surroundings in the dialogue with the driver, the dialogue with the driver is repeated.

12. The information presenting apparatus according to claim 1, wherein the processor is further configured to execute instructions stored in the memory to:
stop the autonomous driving control of the autonomous vehicle when the driver does not perform the response action.

13. The information presenting apparatus according to claim 1, wherein the processor is configured to execute instructions stored in the memory to request the driver to perform the response action every time a predetermined period of time passes or every time the autonomous vehicle performs a predetermined number of cruise control operations.

14. The information presenting apparatus according to claim 1, wherein the processor is configured to execute instructions stored in the memory to request the driver to perform the response action when detecting that the driver is not awake or is not watching ahead.

15. The information presenting apparatus according to claim 1, wherein the processor is configured to execute instructions stored in the memory to set timing to request the driver to perform the response action, based on a state of the driver and a travelling condition and outside circumstance of the autonomous vehicle.

16. The information presenting apparatus according to claim 1, wherein the processor is configured to execute instructions stored in the memory to delay timing to request the driver to perform the response action when the driver manually drives the autonomous vehicle.

17. The information presenting apparatus according to claim 1, wherein the processor is configured to execute instructions stored in the memory to when requesting to perform the response action, display a pattern formed by spatial-frequency and temporal-frequency having no luminance edge.

18. The information presenting apparatus according to claim 1, wherein the processor is configured to execute instructions stored in the memory to when requesting to perform the response action, provide the driver with sensory stimulation in synchronization with displaying an image.

19. An information presenting method performed by an information presenting apparatus for use in an autonomous vehicle capable of switching between autonomous driving control and manual driving control, in which the vehicle is driven by a driver, the information presenting method comprising:
determining a response action for maintaining the autonomous driving control by determining that the driver of the autonomous vehicle approves of the autonomous driving control, wherein the response action being indicative of a driving operation of the autonomous driving control;
requesting the driver to perform the determined response action; and
detecting the response action performed by the driver;
in response to detecting that the response action is not performed by the driver:
determining that the driver is not ready take over when the autonomous driving control is switched to the manual driving control; and
in response to detecting that the response action is performed by the driver:
determining that the driver is ready to take over when the autonomous driving control is switched to the manual driving control; and
maintaining the autonomous driving control of the autonomous vehicle, wherein
performance, by the driver, of the response action, is indicative of an approval of the driver of the continuance of the autonomous driving, and
when a point switch from the autonomous driving control to the manual driving control is predetermined, shortening an interval for requesting the driver to perform the response action as the predetermined point approaches.

20. The information presenting apparatus according to claim 1, wherein the processor is further configured to execute instructions stored in the memory to:
acquire the plurality of self-vehicle behavior candidates generated in accordance with system logic of an autonomous driving system; and determine a feasible driving operation in consideration of surroundings of the autonomous vehicle, as the response action, from the self-vehicle behavior candidate.

21. The information presenting apparatus according to claim 1, wherein the driving operation the plurality of self-vehicle behavior candidates includes driving operations of going straight, turning right, turning left, changing to a left lane, changing to a right lane, stopping, starting, speeding up, or slowing down.

* * * * *